United States Patent
Jahkonen

(10) Patent No.: US 8,384,337 B2
(45) Date of Patent: Feb. 26, 2013

(54) CONVEYOR SYSTEM

(75) Inventor: Pekka Jahkonen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 105 days.

(21) Appl. No.: 12/874,257

(22) Filed: Sep. 2, 2010

(65) Prior Publication Data

US 2010/0327795 A1    Dec. 30, 2010

Related U.S. Application Data

(63) Continuation of application No. PCT/FI2009/000027, filed on Feb. 19, 2009.

(30) Foreign Application Priority Data

Mar. 14, 2008  (FI) ..................... 20080209

(51) Int. Cl.
    *H02P 27/04* (2006.01)
(52) U.S. Cl. ........ 318/801; 318/807; 198/321; 198/323; 198/330
(58) Field of Classification Search .......... 318/801, 318/807, 727, 805, 806; 198/321, 323, 464.2, 198/330, 341.09
    See application file for complete search history.

(56) References Cited

U.S. PATENT DOCUMENTS

| | | | |
|---|---|---|---|
| 2,231,521 A | | 2/1941 | Curry |
| 4,748,394 A | * | 5/1988 | Watanabe ..................... 318/807 |
| 5,027,049 A | * | 6/1991 | Pratt et al. ..................... 318/807 |
| 5,099,977 A | * | 3/1992 | Hirose et al. .................. 198/323 |
| 7,221,121 B2 | * | 5/2007 | Skaug et al. .................. 318/807 |
| 2002/0189905 A1 | | 12/2002 | Spannhake et al. |

FOREIGN PATENT DOCUMENTS

| | | |
|---|---|---|
| EP | 1394097 A1 | 3/2004 |
| GB | 2245385 A | 1/1992 |
| WO | WO-9425386 A1 | 11/1994 |

OTHER PUBLICATIONS

International Search Report of PCT/FI2009/000027 Dated Jun. 10, 2009.
Written Opinion of the International Searching Authority for PCT/FI2009/000027 Dated Jun. 10, 2009.

* cited by examiner

*Primary Examiner* — Antony M Paul
(74) *Attorney, Agent, or Firm* — Venable LLP; Robert Kinberg

(57) ABSTRACT

A conveyor system includes an electric motor to move a conveyor. A voltage determining device is coupled to an alternating-electricity source that supplies alternating electricity to the conveyor system. A power supply appliance supplies power between the electric motor and the alternating-electricity source. The power supply appliance includes an inverter and an inverter control. The inverter includes a rectifying bridge and a motor bridge. The rectifying bridge input is coupled to the alternating-electricity source and the rectifying bridge output is coupled to the motor bridge input. The motor bridge output is coupled to the electric motor. The inverter control is coupled between the voltage determining device and the motor bridge. The inverter control is responsive to frequency and phase of the determined voltage of the alternating-electricity source to adjust the frequency and phase of the motor bridge output voltage such that the motor bridge output voltage is made to be essentially constant.

13 Claims, 4 Drawing Sheets

CONVEYOR SYSTEM

CROSS-REFERENCE TO RELATED APPLICATIONS

This application is a continuation of International Application No. PCT/FI2009/000027, filed Feb. 19, 2009, designating the United States and claiming priority to Finnish Application No. 20080209 filed Mar. 14, 2008, the contents of both applications being incorporated herein by reference in their entireties. Furthermore, all publications cited below are incorporated herein by reference.

BACKGROUND

The invention relates to a conveyor system that includes an electric motor for moving the conveyor and power supply appliance for supplying power between the electric motor and the alternating-electricity source of the conveyor system. The power supply appliance includes an inverter, which comprises a rectifying bridge connected to the alternating-electricity source, and also a motor bridge connected to the electric motor. Such a conveyor system also includes a device for determining the voltage of the alternating-electricity source.

The invention also relates to a method for controlling the power in a conveyor system of the foregoing type.

In a conveyor system of the above type, power is supplied to the motor for moving the conveyor. For example, in an escalator system, power supply to the motor generally occurs by connecting the phases of the motor directly to the electricity network with mechanical switches, such as contactors.

It is also possible to connect the power supply to the motor of the conveyor system via a frequency converter. In this case the conveyor can be used at a reduced speed with the frequency converter when the loading is small, and when the loading increases the power supply can be connected directly from the electricity network, for example, by connecting the phases of the motor directly to the electricity network. U.S. Pat. No. 4,748,394 discloses this type of arrangement.

Problems are associated with the aforementioned type of arrangement. If the control of the conveyor enables changing the speed during the running of the conveyor, for safety reasons the motion of the conveyor must be monitored because a change in speed in the middle of a run could lead to a dangerous situation. For example, a sudden change in the speed of an escalator can cause passengers to fall over. The aforementioned type of dangerous situation is possible, for example, when using a frequency converter for regulation of the speed of the conveyor. Using the conveyor at different speeds often requires measurement of the speed with two different sensors. In addition, a safety arrangement is required that stops the operation of the conveyor in a dangerous situation.

Before the motor of a conveyor system that operates at reduced speed can be connected directly to the electricity network, the speed of the conveyor must first be increased so that the frequency and phase of the supply voltage of the frequency converter can be synchronized with the network. The speed regulation the conveyor and also the synchronization of the supply voltage of the frequency converter require very complex control logic. In addition, so that the speed of the conveyor can be increased to the synchronization speed during low loading of the motor, it must be possible to forecast a change in the loading of the conveyor in some way. For this reason, for example, in connection with an escalator system or travelator system, different sensors that forecast the traffic flow of the conveyor must often be positioned with the arrival route of passengers.

SUMMARY

An object of the present invention is to solve the aforementioned problems as well as the problems disclosed in the description below.

The above and other objects are accomplished by the provision of a conveyor system which includes, in one embodiment, a conveyor; an electric motor to move the conveyor; a voltage determining device coupled to an alternating-electricity source that supplies alternating electricity to the conveyor system; a power supply appliance to supply power between the electric motor and the alternating-electricity source of the conveyor system, the power supply appliance comprising: an inverter, the inverter including a rectifying bridge having an input and an output, and a motor bridge having an input an output, the rectifying bridge input adapted to be coupled to the alternating-electricity source and the rectifying bridge output being coupled to the motor bridge input, the motor bridge output being coupled to the electric motor; and an inverter control coupled between the voltage determining device and the motor bridge, the inverter control being responsive to frequency and phase of the determined voltage of the alternating-electricity source to adjust a frequency and phase of the motor bridge output voltage such that the output voltage of the motor bridge is made to be essentially constant.

According to another aspect of the invention there is provided a method for controlling power in a conveyor system of the above type, which includes determining the frequency and phase of the voltage of the alternating electricity source; and adjusting the frequency and phase of the output voltage of the motor bridge directly on the basis of the frequency and phase of the voltage of the alternating-electricity source.

Further embodiments are described below. The conveyor system referred to herein may be, for example, an escalator system, a travelator system, or a belt conveyor system. In this type of conveyor system according to the invention, a load, such as passengers, goods or raw materials, is moved along the path of motion of the conveyor.

In one embodiment of the conveyor system according to the invention, the conveyor may have two operating modes: an idling mode and a heavy loading mode, which operating modes are determined based on the identification of the presence of a load.

In another embodiment of the invention, the power supply of the motor is arranged via the inverter in the idling mode, and the phases of the motor are connected with shunt switches of the inverter directly to the alternating-electricity source immediately after the heavy loading mode has been determined.

In a further embodiment of the invention the electric motor that moves the conveyor is connected during motor braking directly to the electricity network with the control of the shunt switch of the inverter.

The electric motor that moves the conveyor according to the invention may be, for example, an induction motor, such as a squirrel-cage motor.

The alternating-electricity source according to the invention may be, for example, an electricity network or an alternating-electricity generator.

In one embodiment of the invention, the frequency and phase of the output voltage of the motor bridge are determined directly from the voltage of the alternating-electricity source by means of a phase-locked loop.

In another embodiment of the invention, the loading of the conveyor may be determined from the electrical parameters of the inverter, e.g. from the supply power of the motor or from the current of the rectifying bridge.

In a further embodiment of a conveyor system according to the invention, the identification of the presence of a load may be performed with a photoelectric cell which may be arranged on the path of motion of the conveyor.

In another embodiment of the invention, filtering of the harmonics of the current of the alternating-electricity source is arranged in connection with the rectifying bridge of the inverter.

The solid-state switches of the inverter according to the invention can be, for instance, IGBT transistors, MOSFET transistors, or thyristors.

The shunt switches of the inverter according to the invention may be, for instance, relays or contactors, or they may also be solid-state switches.

According to another embodiment, the conveyor system according to the invention may include an identification device to identity the presence of a load of the conveyor. The conveyor system may also comprises an electric motor for moving the conveyor, and also a power supply appliance for supplying power between the electric motor and the alternating-electricity source of the conveyor system. The power supply appliance comprises an inverter, which comprises a rectifying bridge connected to the alternating-electricity source and also a motor bridge connected to the electric motor. The conveyor system may further comprises a mechanism to determine the voltage of the alternating-electricity source. The output voltage of the motor bridge may be made to be essentially of constant frequency such that the frequency and phase of the output voltage of the motor bridge are adjusted with the inverter control directly on the basis of the frequency and phase of the determined voltage of the alternating-electricity source. In this case the output voltage of the motor bridge may be synchronized with the voltage of the alternating-electricity source during operation of the conveyor, in which case connecting the electric motor directly to the alternating electricity source can be performed by controlling the shunt switch of the inverter purely on the basis of the loading of the conveyor.

In one embodiment of the invention, the frequency and phase of the output voltage of the motor bridge are adjusted by the inverter control directly on the basis of the frequency and phase of the determined voltage of the alternating-electricity source, without a determination of the motion of the conveyor. In this case, as the components become fewer and the regulation of motion becomes simpler, the reliability and safety of the system improve.

Since the frequency and phase of the output voltage of the motor bridge do not, according to the invention, essentially change during operation of the conveyor, and the speed of the conveyor does not change according to the loading before the control of the shunt switch, the shunt switch of the inverter may be controlled immediately when the loading of the conveyor increases. An increase in the loading of the conveyor therefore does not need to be forecast with separate measuring sensors, as used in conventional conveyor systems for forecasting growth in the traffic flow. Growth of the loading can be determined according to the invention, for example, with a simple photoelectric cell arranged on the path of motion of the conveyor.

When using, for example, a squirrel-cage motor as the motor of the conveyor, the conveyor may be started according to the invention by increasing the amplitude of the output voltage of the motor bridge in stages, in which case the conveyor accelerates in a controlled manner to the speed of light loading. This reduces the switching current peaks of both the motor and the alternating electricity source compared to known systems in which the electric motor is connected directly to the electricity network, for example, with contactors.

When the frequency of the output voltage of the motor bridge of the inverter is adjusted according to the invention directly on the basis of the frequency of the alternating electricity source, the inverter control may be performed such that no rotating voltage vectors can be produced in the electric motor other than at the constant frequency of the alternating electricity source. In this case two separate motion measurement sensors are not needed in the conveyor system, nor does the motion of the conveyor need to be monitored in the same way as in conventional conveyor systems that can be regulated with a frequency converter.

In one embodiment of the invention, the loading of the conveyor is determined based on the identification of the presence of a load of the conveyor, and the amplitude of the output voltage of the motor bridge is adjusted on the basis of the determined loading of the conveyor. When the amplitude of the output voltage of the motor bridge is adjusted on the basis of the loading of the conveyor, the amplitude can be changed according to the loading of the electric motor that moves the conveyor. With a small loading of the conveyor the power requirement of the electric motor is also small, and in this case a large supply voltage of the motor bridge produces an unnecessarily large excitation current of the motor. Growth of the excitation current on the other hand increases the power losses of the motor, e.g. in the form of eddy current losses. By reducing the amplitude of the supply voltage, the power losses during small loading of the motor can be decreased, which on the one hand saves energy and on the other hand also reduces heating of the motor.

In one embodiment of the invention the power supply appliance may comprise a switch arrangement. The switch arrangement may include at least one controllable shunt switch of the inverter, which is fitted between the alternating-electricity source and the electric motor. The electric motor may be connected to the alternating-electricity source with the control of the aforementioned shunt switch. When the inverter is bypassed and the power required by the electric motor is supplied during large loading of the conveyor directly from the alternating electricity source, the inverter may be dimensioned for a smaller current handling capacity and power handling capacity. The power requirement of the conveyor when idling comprises mainly only the friction losses of motion, and the power requirement is in this case often only 5 per cent of the power requirement of the full loading. That being the case, dimensioning of the inverter for idling or otherwise for a loading essentially smaller than a full load essentially reduces also the dimensioning of the main circuit of the inverter.

A rectifying bridge implemented with diodes can be used as the rectifying bridge of the inverter. A switch arrangement of three change-over switches, on the other hand, which type is generally used e.g. in frequency converters, can be used as the motor bridge.

BRIEF DESCRIPTION OF THE DRAWINGS

In the following, the invention will be described in more detail with the aid of a few embodiments with reference to the attached drawings, wherein.

DETAILED DESCRIPTION

Figure 1:
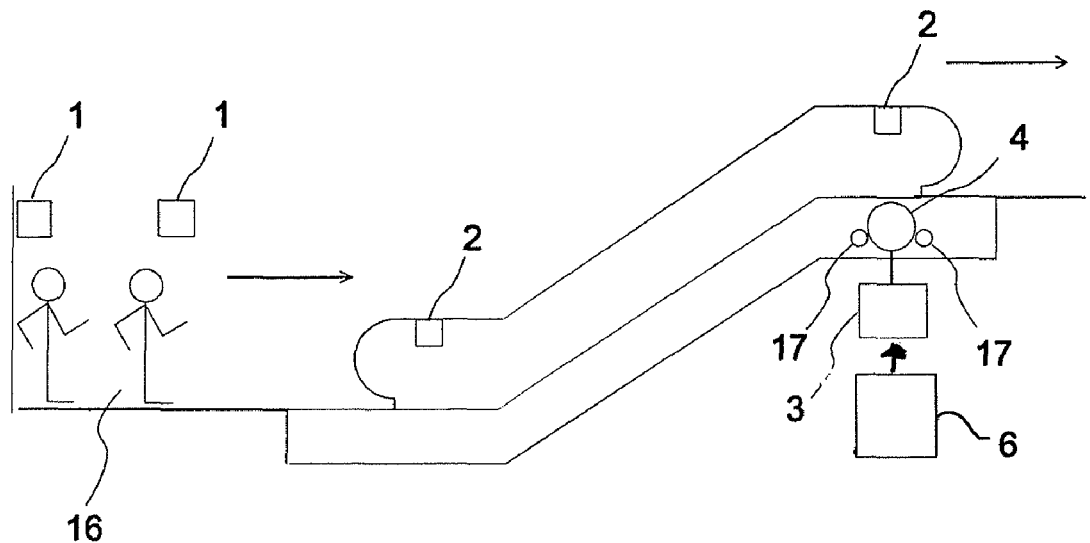
FIG. 1 is a schematic showing an escalator system according to prior art.

FIG. 1 shows a prior-art escalator system. In the operating situation according to FIG. 1 the escalator is arranged to move the arriving passengers 16 in the direction of the arrow to an upper exit level. The escalator system comprises an electric motor 4, with which the escalator is driven. The motor 4 is connected to transmit mechanical power to the stairs of the escalator, and the stairs are moved with the motor along the path of motion of the escalator. Power supply between the electric motor and the electricity network 6 occurs with a power supply appliance 3. The power supply appliance 3 includes a frequency converter, with which the speed of the escalator is adjusted. When the loading of the escalator is small, the escalator is used with limited speed. When it is detected that the loading of the escalator has increased, the speed of the escalator is accelerated, and when the speed has grown sufficiently the frequency and phase of the output voltage of the frequency converter are synchronized with the frequency and phase of the voltage of the electricity network 6, after which the electric motor 4 is connected directly to the electricity network with a separate contactor. The power supply of the escalator with a large loading is arranged to occur directly from the electricity network 6. The frequency converter is in this case dimensioned for a small motor current according to a small load, and power supply with the frequency converter during heavy loading is not possible.

In order for the escalator to have time to accelerate to the speed of heavy loading, and in order for the output voltage of the frequency converter to also have time to synchronize with the network voltage 6 before the loading of the escalator has increased too much, it must be possible to forecast the loading of the escalator. For this reason, separate motion measurement sensors 1 are arranged beside the arrival route of passengers. These types of motion measurement sensors may be, for example, transmitter/receiver pairs using an acoustic or electromagnetic measuring signal. addition, at least one transmitter/receiver pair 2 of the photoelectric cell is fitted to the path of motion of the escalator, for safety reasons, such that the control beam between the transmitter/receiver pair is cut when a passenger crosses it.

A tachometer 17, which functions as a speed feedback in the adjustment of the speed of the frequency converter, is connected with tractive friction in connection with the rotor of the motor 4. Since changing the speed is possible with the frequency converter also during operation of the escalator, the speed of the escalator must, for safety reasons, be monitored. For this reason two separate tachometers, with which two-channel monitoring of the speed of the escalator is performed, are connected to the motor. In this case if the speed of the escalator deviates from the set speed by more than permitted, or correspondingly if the separate measurements of speed deviate from each other, a fault situation is inferred and the operation of the escalator is stopped.

If the operating direction of the escalator is changed, such that passengers start to be moved from a higher entrance level to a lower exit level, the motor driving the escalator starts to brake power to the network. The motor of the escalator is connected directly to the electricity network during motor braking with the contactor.

Figure 2:
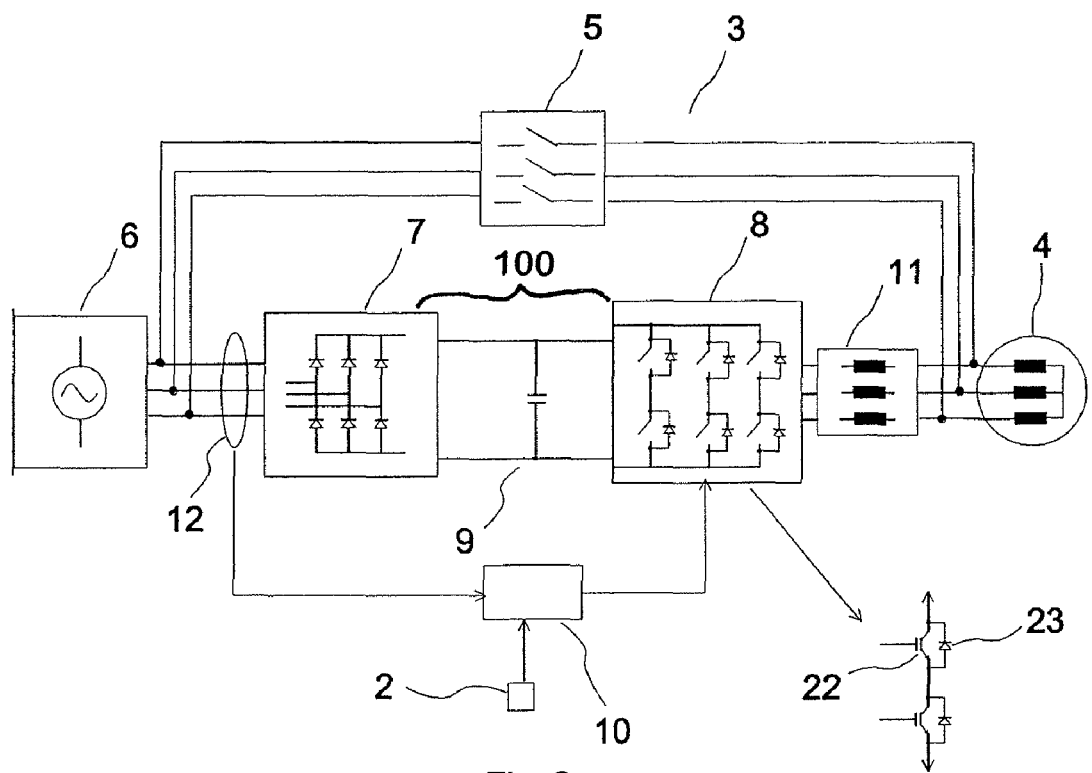
FIG. 2 is a block diagram showing a power supply appliance of a conveyor system according to the invention.

Referring to FIG. 2, the escalator system according to the invention differs from that presented in FIG. 1 in that the power supply of the motor 4 with an essentially small loading of the escalator occurs with an inverter 100 instead of with a frequency converter. Inverter 100 includes a rectifying bridge 7 coupled to a motor bridge 8 by an intermediate circuit 9. The frequency and phase of the output voltage of the inverter are adjusted with an inverter control 10 directly on the basis of the frequency and phase of the voltage of the electricity network 6. In this case the frequency and phase of the output voltage of the inverter are always synchronized with the network voltage during operation of the conveyor, and the frequency is essentially constant. Owing to the synchronization, the supply frequency of the motor is also constant, for which reason the motor can also be connected directly to the network voltage immediately after the loading of the escalator has exceeded a set limit value. Since the supply frequency of the motor that moves the escalator cannot, in the power control according to the invention, be regulated, it is not necessary to forecast a change in the loading of the escalator. As a result, the escalator system according to the invention does not need to include the separate motion measuring sensors 1 required by the known conveyor systems represented in FIG. 1. The loading of the escalator in the escalator system according to the invention may be determined using just, for example, a photoelectric cell 2 that identifies the presence of a load of the escalator, arranged on the path of motion of the escalator. For the aforementioned reason, the monitoring of the speed of the escalator is also simplified.

The determination of the loading of the escalator may occur in the escalator system according to the invention, for example, such that the number of passengers during a certain period of time that pass along the path of motion of the escalator through the photoelectric cell is measured by the photoelectric cell 2. When the aforementioned number of passengers per unit of time has exceeded a set first limit value, the motor of the escalator may be connected directly to the electricity network with the control of a shunt switch 5 of the inverter. When, on the other hand, the aforementioned number of passengers per unit of time falls below a second limit value that is smaller than the first, the motor may be disconnected from the electricity network by controlling the shunt switch 5 to be open, and the power supply of the motor 4 is continued with the inverter.

Figure 5A:
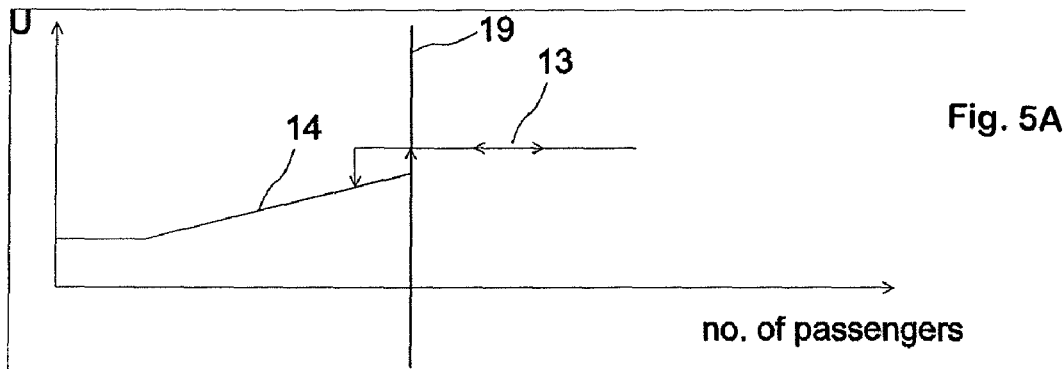
FIGS. 5A-5C are graphs showing amplitude of the output voltage of the motor bridge according to the invention as a function of the loading of the conveyor system.
Figure 5B:
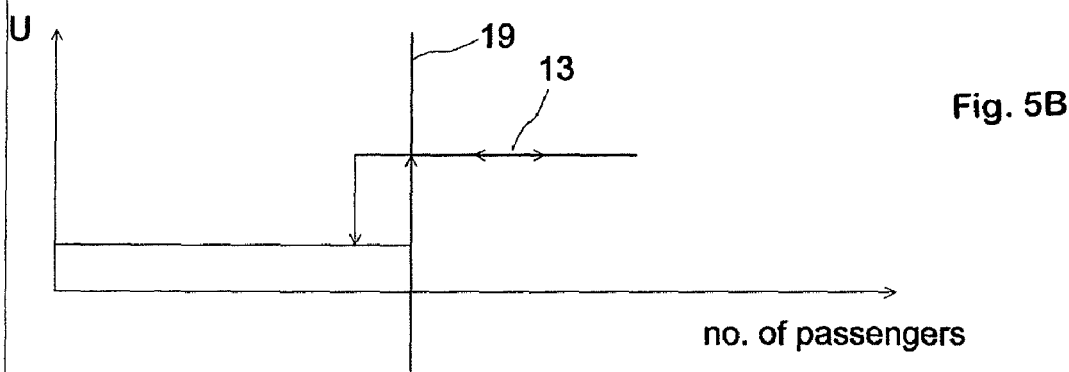
Figure 5C:
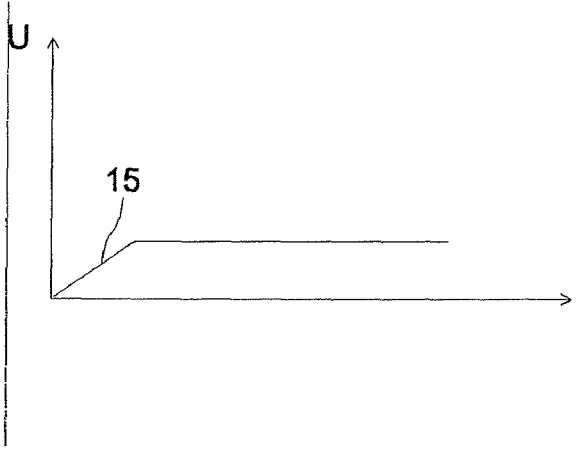

The amplitude of the output voltage of the motor bridge 8 of the inverter 100 is changed according to the number of passengers, as shown for example according to FIGS. 5A-5C. The amplitude can be increased in stages 14 according to the curve in FIG. 5A, until the number of passengers per unit of time exceeds the set limit value 19. When this happens, the phases of the motor 4 are connected directly to the electricity network 6 with the control of the shunt switch 5 of the inverter such that the output voltage is held constant as shown at 13. When the number of passengers per unit of time falls below a second limit value that is smaller than the first, the power supply of the motor 4 is continued with the inverter. The situation according to the curves in FIGS. 5B and 5C differ from that presented in the curve FIG. 5A in that a constant value that is smaller than the amplitude of the voltage of the electricity network 6 is set for the output voltage of the motor bridge 8 of the inverter. FIG. 5C also shows how during the starting of the escalator the output voltage of the motor bridge 8 may be increased in stages 15 to a pre-determined value of light loading. In this case, starting of the escalator does not cause switching peaks for the electricity network or for the motor. Again, as shown in FIG. 5B, when the number of passengers per unit of time falls below a second limit value that is smaller than the first value 19, the power supply of the motor 4 is continued with the inverter.

As shown in FIG. 2, the conveyor system according to the invention comprises a power supply appliance 3 that drives the motor 4 of the conveyor. The power supply appliance comprises the inverter 100, which comprises the rectifying bridge 7 connected to the electricity network 6, and also the motor bridge 8 connected to the motor 4. The rectifying bridge 7 and the motor bridge 8 are connected to each other with the DC intermediate circuit 9. The rectifying bridge 7 converts the three-phase alternating voltage of the electricity network 6 into the DC voltage of the DC intermediate circuit 9, and the motor bridge 8 further converts the voltage of the DC intermediate circuit 9 into alternating voltage for the output of the motor bridge 8. In this case the inverter control 10 adjusts the output voltage of the motor bridge 8 by controlling the solid-state switches of the motor bridge 8 with a switching reference according to pulse-width modulation. The inverter control 10 adjusts the frequency and phase of the output voltage of the motor bridge 8 directly on the basis of the frequency and phase of the voltage of the electricity network 6. The voltage of the electricity network 6 is measured with the voltage measuring circuit 12 in a known manner. The inverter control 10 adjusts the amplitude of the output voltage of the motor bridge 8 on the basis of the loading of the escalator. The aforementioned loading is determined, for example, by a photoelectric cell 2 arranged in the path of motion of the escalator as described above.

The power supply appliance 3 also comprises the switch arrangement 5, which includes three normally-open contacts of a contactor, which function as the shunt switches of the inverter. The motor 4 is connected directly to the electricity network 6 with the control of the aforementioned shunt switches. The shunt switches of the inverter 100 and the controls of the solid-state switches 22 of the motor bridge are synchronized with each other such that the switches 22 of the motor bridge 8 are controlled to be open before the closing of the shunt switches 5 of the inverter 100. Counter, parallel-connected diodes 23 are connected in parallel with the controllable switches 22 of the motor bridge. When the shunt switches 5 open, the current traveling in the winding of the motor 4 commutates to the intermediate circuit 9 of the inverter via the counter, parallel-connected diodes 23. In this case, the phases of the motor bridge 8 do not necessarily need to be isolated from the winding of the motor with separate contactors. In this embodiment of the invention, the phases of the motor bridge 8 and of the motor 4 are connected to each other via a separate choke 11. It is endeavored with the choke to reduce possible surge currents in a control situation of the shunt switches 5.

Figure 3:
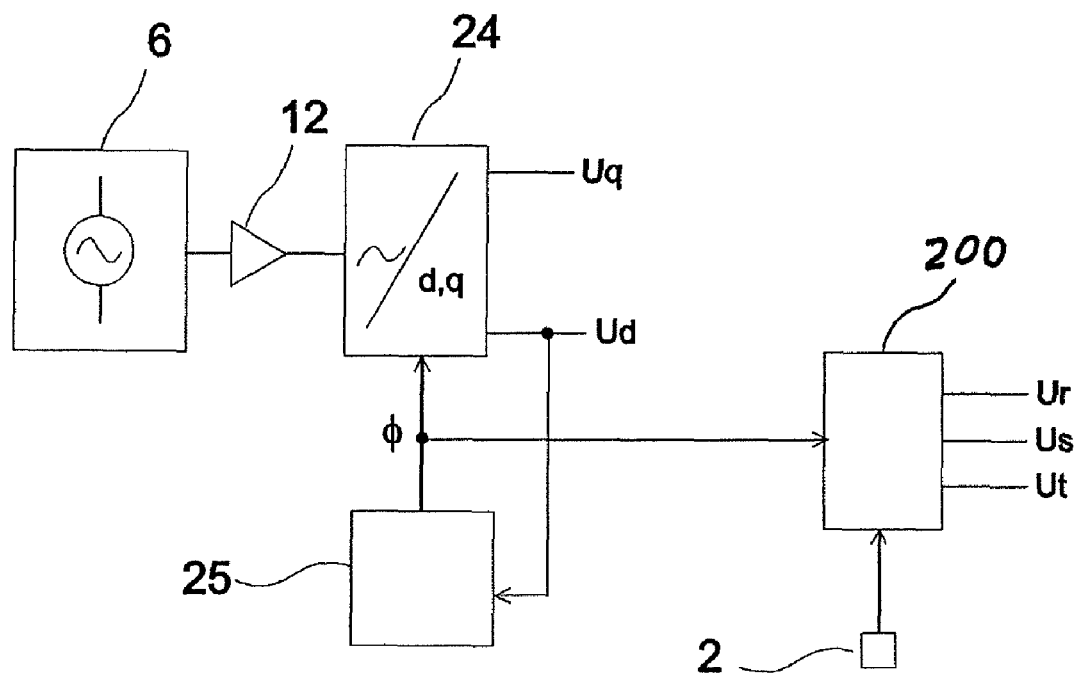
FIG. 3 is a block diagram showing an embodiment of an inverter control according to the invention.

FIG. 3 shows an adjustment of the frequency and phase of the output voltage of the motor bridge 8 according to an embodiment of the invention. In this embodiment of the invention, the frequency and phase of the motor bridge 8 are synchronized to the voltage of the electricity network 6 with a phase-locked loop. The reference values Ur, Us, Ut of the output voltages of the motor bridge are synchronized in an auxiliary coordinate system 24, which is configured to rotate at a set constant frequency 25 that simulates the frequency of the electricity network 6. The frequency and phase of the reference values of the output voltages of the motor bridge are corrected with respect to the measured voltage of the electricity network by comparing the reference values of the output voltages to the voltage of the electricity network. In this case the correction can be made, for example, by comparing the zero points of the reference values of the output voltages of the motor bridge to the zero points of the voltage of the electricity network. The correction can also be made by comparing the voltage presented in the auxiliary coordinate system 24 of the electricity network to the correspondingly presented reference values of the output voltages of the motor. In this case the phase voltages of the electricity network 6 are measured, and the phase voltages are converted into the auxiliary coordinate system 24, the axes of which are in FIG. 3 marked with the symbols d, q. The auxiliary coordinate system is synchronized using a condition wherein the second of the components of network voltage in the direction of the axes of the auxiliary coordinate system is kept as a constant. The components of the network voltage in the direction of the axes of the coordinate system are described here with the magnitudes Ud and Uq, and the synchronization condition Ud is in this case set as zero. The angle of the auxiliary coordinate system is made more precise according to the synchronization condition for the phase of the network voltage. Since the reference values Ur, Us and Ut of the output voltages of the motor bridge are synchronized in an auxiliary coordinate system, and since again the position of the auxiliary coordinate system is corrected on the basis of the voltage of the electricity network, the phase and frequency of the reference values of the output voltages are in this case set directly on the basis of the frequency and phase of the voltage of the electricity network 6. The amplitudes of the output voltages, on the other hand, are determined on the basis of the identification 2 of the presence of a load. Switching references are further formed from the reference values of the output voltages for the solid-state changeover switches of the motor bridge with pulse-width modulation 27.

Figure 4:
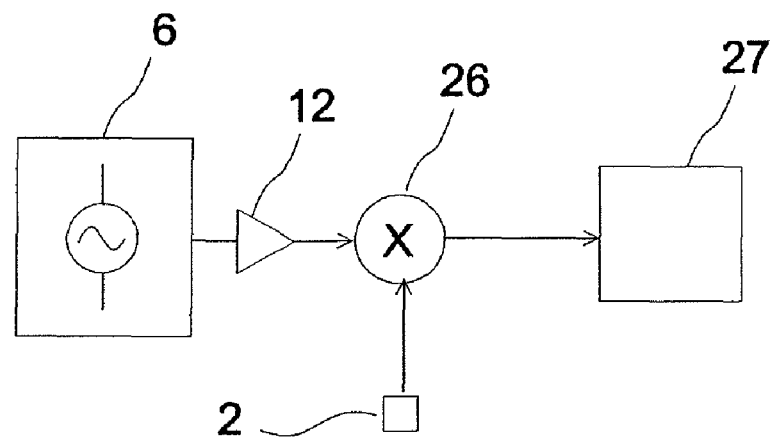
FIG. 4 is a block diagram showing a another embodiment of an inverter control according to the invention.

FIG. 4 presents a second adjustment of the frequency and phase of the output voltage of the motor bridge 8 according to the invention. Here the reference values of the output voltages of the motor bridge 8 of the inverter are obtained by multiplying the measured value of the voltage of the electricity network 6 by the loading data of the conveyor. The frequency and phase of the supply voltage of the motor bridge 8 are in this case in synchrony with the voltage of the electricity network, and the amplitude of the supply voltage of the motor bridge is determined from the loading data of the conveyor such that the amplitude increases as the load grows.

Figure 6:
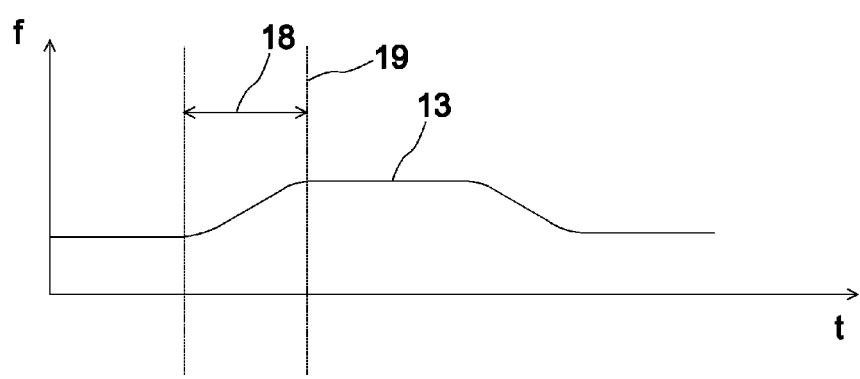
FIG. 6 presents the frequency of the output voltage of the frequency converter as a function of time in a prior art conveyor system.

FIG. 6 presents the frequency of the output voltage of the frequency converter as a function of time in a conveyor system according to prior art. When the loading is small, the conveyor is used with limited speed. When it is detected that the loading of the conveyor is increasing, accelerating of the conveyor to the speed 113 of heavy loading is started. A time delay 118 is marked in FIG. 6, which stretches from the time when an increase in the load is detected to the point in time 119, in which case the frequency and phase of the output voltage of the frequency converter are in synchrony with the frequency and phase of the voltage of the electricity network 6, and the phases of the motor can be connected directly to the electricity network with a contactor.

The invention is not limited solely to the embodiments described above, but instead many variations are possible within the scope of the inventive concept defined by the claims below.

What is claimed is:

1. A conveyor system, comprising:
a conveyor;
an electric motor to move the conveyor;
a voltage determining device adapted to be coupled to an alternating-electricity source that supplies alternating electricity to the conveyor system;
a power supply apparatus to supply power between the electric motor and the alternating-electricity source of the conveyor system, the power supply apparatus comprising:
an inverter, the inverter including a rectifying bridge having an input and an output, and a motor bridge having an input and output, the rectifying bridge input adapted to be coupled to the alternating-electricity source and the rectifying bridge output being coupled to the motor bridge input, the motor bridge output adapted to be coupled to the electric motor;
an inverter control coupled between the voltage determining device and the motor bridge, the inverter control being responsive to a frequency and phase of the determined voltage of the alternating-electricity source to adjust the frequency and phase of the motor bridge output voltage such that the frequency and phase of the output voltage of the motor bridge is made to be essentially constant; and
a switch arrangement configured to connect the electric motor directly to the alternating electricity source after a determined loading of the conveyor exceeds a set limit value.

2. The conveyor system according to claim 1, wherein the inverter control adjusts the frequency and phase of the output voltage of the motor bridge directly as a function of the frequency and phase of the determined voltage of the alternating-electricity source without a determination of motion of the conveyor.

3. The conveyor system according to claim 1, further comprising an identification device to identify a presence of a load of the conveyor and having an output coupled to the inverter control; wherein the loading of the conveyor is determined based on the identification of the presence of the load of the conveyor, and the amplitude of the output voltage of the motor bridge is adjusted on the basis of the determined loading of the conveyor.

4. The conveyor system according to claim 1, wherein the switch arrangement includes at least one controllable shunt switch arranged between the alternating-electricity source and the electric motor; and wherein the electric motor is coupled to the alternating-electricity source with the controllable shunt switch.

5. The conveyor system according to claim 4, further including an identification device to identify a presence of a load of the conveyor and having an output coupled to the inverter control, wherein the electric motor is controlled solely on the basis of the determined loading of the conveyor.

6. The conveyor system according to claim 1, further comprising an identification device to identify a presence of a load of the conveyor and having an output coupled to the inverter control; wherein the determined loading of the conveyor is determined based on the identification of the presence of the load of the conveyor, and the amplitude of the output voltage of the motor bridge is adjusted on the basis of the determined loading of the conveyor without adjusting the frequency of the output voltage.

7. A conveyor system, comprising:
a conveyor;
an electric motor to move the conveyor;
a voltage determining device adapted to be coupled to an alternating-electricity source that supplies alternating electricity to the conveyor system;
a power supply apparatus to supply power between the electric motor and the alternating-electricity source of the conveyor system, the power supply apparatus comprising:
an inverter, the inverter including a rectifying bridge having an input and an output, and a motor bridge having an input and output, the rectifying bridge input adapted to be coupled to the alternating-electricity source and the rectifying bridge output being coupled to the motor bridge input, the motor bridge output adapted to be coupled to the electric motor; and
an inverter control coupled between the voltage determining device and the motor bridge, the inverter control being responsive to a frequency and phase of the determined voltage of the alternating-electricity source to adjust the frequency and phase of the motor bridge output voltage such that the output voltage of the motor bridge is made to be essentially constant,
wherein the power supply apparatus further comprises a switch arrangement, the switch arrangement including at least one controllable shunt switch arranged between the alternating-electricity source and the electric motor; and wherein the electric motor is coupled to the alternating-electricity source with the controllable shunt switch,
wherein the power supply apparatus includes a choke, the motor bridge comprises solid-State switches including a counterparallel-connected diode and a controllable switch connected in parallel with the counterparallel-connected diode; the motor bridge has phases connected to phases of the electric motor via the choke; and a pole of the controllable shunt switch between the electric motor and the alternating-electricity source is connected between a phase of the electric motor and the choke.

8. A method for controlling the power in a conveyor system, wherein the conveyor system includes: a conveyor; an electric motor to move the conveyor; a voltage determining device connected to an alternating-electricity source for the conveyor system to determine the voltage of the alternating-electricity source; a power supply apparatus to supply power between the electric motor and an alternating-electricity source of the conveyor system, the power supply apparatus comprising an inverter, wherein the inverter includes a rectifying bridge and a motor bridge, the rectifying bridge having an input adapted to be coupled to the alternating-electricity source and output coupled to an input of the motor bridge, and an output of the motor bridge is adapted to be coupled to the electric motor; the method comprising:
determining the frequency and phase of the voltage of the alternating electricity source;
adjusting the frequency and phase of an output voltage of the motor bridge directly on the basis of the frequency and phase of the voltage of the alternating-electricity source such that the frequency and phase of the output voltage of the motor bridge is made to be essentially constant;
setting a limit value for the loading of the conveyor; and
connecting the electric motor directly to the alternating electricity source after a determined loading of the conveyor exceeds the set limit value.

9. The method according to claim 8, wherein the adjusting step includes adjusting the frequency and phase of the output voltage of the motor bridge directly on the basis of the frequency and phase of the voltage of the alternating-electricity source without determining motion of the conveyor.

10. The method according to claim 8, including identifying a presence a load; determining loading of the conveyor on the basis of the identification of the presence of a load; and adjusting an amplitude of the output voltage of the motor bridge as a function of the determined loading of the conveyor.

11. The method according to claim 8, wherein the conveyor system includes a controllable shunt switch coupled between the alternating-electricity source and the electric motor, and the method includes controllably connecting the electric motor directly to the alternating electricity source with the controllable shunt switch.

12. The method according to claim 8, including identifying a presence a load; determining the determined loading of the conveyor on the basis of the identification of the presence of a load; and adjusting an amplitude of the output voltage of the motor bridge as a function of the determined loading of the conveyor without adjusting the frequency of the output voltage.

13. A method for controlling the power in a conveyor system, wherein the conveyor system includes: a conveyor; an electric motor to move the conveyor; a voltage determining device connected to an alternating-electricity source for the conveyor system to determine the voltage of the alternating-electricity source; a power supply apparatus to supply power between the electric motor and an alternating-electricity source of the conveyor system, the power supply apparatus comprising an inverter, wherein the inverter includes a rectifying bridge and a motor bridge, the rectifying bridge having an input adapted to be coupled to the alternating-electricity source and output coupled to an input of the motor bridge, and an output of the motor bridge is adapted to be coupled to the electric motor; the method comprising:

determining the frequency and phase of the voltage of the alternating electricity source;

adjusting the frequency and phase of the output voltage of the motor bridge directly on the basis of the frequency and phase of the voltage of the alternating-electricity source, and setting a limit value for the loading of the conveyor; and connecting the electric motor directly to the alternating electricity source after a determined loading of the conveyor exceeds the set limit value, wherein the conveyor system includes a controllable shunt switch coupled between the alternating-electricity source and the electric motor, and the method includes controllably connecting the electric motor directly to the alternating electricity source with the controllable shunt switch.

\* \* \* \* \*